United States Patent [19]
Balaba et al.

[11] Patent Number: 5,527,562
[45] Date of Patent: Jun. 18, 1996

[54] SILOXANE COATINGS FOR ALUMINUM REFLECTORS

[75] Inventors: Willy M. Balaba, Monroeville; Frank A. Mozelewski, Lower Burrell, both of Pa.

[73] Assignee: Aluminum Company of America, Pittsburgh, Pa.

[21] Appl. No.: 327,503

[22] Filed: Oct. 21, 1994

[51] Int. Cl.$^6$ ..................................................... B05D 1/18
[52] U.S. Cl. ...................... 427/430.1; 427/162; 427/387; 427/388.1; 427/388.2; 427/388.4
[58] Field of Search ................... 427/387, 388.1, 427/388.2, 388.4, 162, 430.1; 362/296

[56] References Cited

U.S. PATENT DOCUMENTS

| | | | |
|---|---|---|---|
| 3,410,636 | 11/1968 | Herrick | 350/288 |
| 4,105,821 | 8/1978 | Blaich et al. | 428/215 |
| 4,348,463 | 9/1982 | Ohno et al. | 428/429 |
| 4,482,209 | 11/1984 | Grewal et al. | 350/642 |
| 4,562,517 | 12/1985 | Pankin | 362/147 |
| 5,043,789 | 8/1991 | Linde et al. | 357/52 |
| 5,358,747 | 10/1994 | Balaba et al. | 427/387 |

FOREIGN PATENT DOCUMENTS

| | | |
|---|---|---|
| 662670 | 5/1963 | Canada. |
| 89148259 | 12/1988 | Japan. |
| 489868 | 6/1970 | Switzerland. |
| 1066817 | 4/1967 | United Kingdom. |
| 2061480 | 1/1987 | United Kingdom. |
| 2177814 | 1/1987 | United Kingdom. |

OTHER PUBLICATIONS

Floch et al., "Optical Coatings Prepared from Colloidal Media," *Thin Solid Films 175* (1989), Lausanne, CH. no month.

Murphy et al., "Thermal and Oxidation Stability of Polymethylphenylsiloxanes," *Industrial and Engineering Chemistry 42* (1950). no month.

*Primary Examiner*—Shrive Beck
*Assistant Examiner*—David M. Maiorana
*Attorney, Agent, or Firm*—Douglas G. Glantz; David W. Brownlee

[57] ABSTRACT

A novel polymer-coated reflector aluminum is coated with an aromatic polysiloxane liquid coating solution polymerized to have non-linear, ladder silicon to oxygen bonding. A metal layer or substrate coated with the aromatic polysiloxane liquid polymer provides enhanced planarization and total reflectivity. The novel aromatic polysiloxane liquid polymer-coated metal preferably includes a non-linear, ladder aromatic polysiloxane polymer-coated aluminum metal sheet such as provided by polyphenylsiloxane polymer having the general formula $R_nSiO_{(4-n)/2}$, wherein R comprises phenyl radical, and n has an average value of about 0.95 to 1.05.

13 Claims, 3 Drawing Sheets

SILOXANE COATINGS FOR ALUMINUM REFLECTORS

BACKGROUND OF THE INVENTION

1. Technical Field

The present invention relates to aluminum reflector lighting systems.

2. Background of the Invention

Aluminum sheet material is used commercially in reflector systems for electric lighting fixtures.

Specular aluminum sheet material having higher total reflectance is preferred for commercial reflector systems in the lighting fixtures. By specular is meant relating to, or having the qualities of, a mirror. A higher total reflectance of the aluminum lighting sheet material increases the efficiency of the lighting fixtures and reduces consumption of electricity.

Laminated silver films on reflector lighting products on a steel base are reported to have Total Reflectance (TR) and Distinctness of Image (DI) values of ≧95%. Although the optical properties of the laminated silver product have customer appeal, silver film reflector products suffer from premature (less than 5 years) delamination and yellowing. Over time, steel suffers from corrosion.

Pankin, U.S. Pat. No. 4,562,517, discloses a method for improving the efficiency of lighting fixtures by providing a reflector coated with a film of silver covered by a polyester or other plastic or a reflector coated with a silver film, e.g., vapor coated, onto the polyester or other plastic. Such reflectors perform adequately for a while, but they are subject to delamination over long periods of time. Moreover, the silver film adds a high cost to the process.

Thin film reflectors incorporating bright dip and anodized (BDA) aluminum sheet provide good TR and DI and further can provide superior abrasion resistance and long life to the layered product. Commercially available BDA reflector material having average total reflectance TR and distinctness of image DI values of 86% and 90%, respectively, with a lifetime warranty of 25 years compete with the laminated silver equivalent, which has TR and DI values greater than 95%. Customer appeal for such BDA thin film reflectors, however, is compromised by cost.

Chemical brightening, also referred to as "bright dip," can provide a bright and specular finish on aluminum sheet material. Bright dip typically can use a phosphoric acid to chemically polish the metal when buffing or electropolishing are not efficient or economical. Bright dipping is a process for increasing the specularity or brightness of aluminum by leveling the microscopic roughness or peaks and valleys on the surface of aluminum sheet and workpieces. The surface of aluminum sheet can be visualized as a series of high and low areas, or peaks and valleys. For a bright dip to smooth this surface, there must be a faster rate of chemical attack and more metal removed at the peaks than in the valleys.

Anodizing is an electrolytic process which produces an oxide coating on aluminum and its alloys for both protective and decorative purposes. Anodizing processes can produce a hard, adherent, protective, and transparent coating of aluminum oxide on a brightened aluminum surface. The protective and clear oxide coating can be produced in an anodizing solution, e.g., containing sulfuric acid. The oxide coating thickness is produced in electrochemical proportion to the electric current employed, or to the time of coating if the electric current remains constant.

Sealing treatments make the porous aluminum oxide coating formed in the anodizing process impermeable, non-adsorptive, and nonstaining. The oxide coating, being porous, decreases the coating resistance to corrosion and increases undesirable staining and coloring. Generally, sealing can be accomplished by treating anodized surfaces in hot water.

Specular aluminum sheet materials produced by bright dip and anodizing processes typically can have a total reflectance of about 87% or more. This higher total reflectance of specular sheet material increases the efficiency of lighting fixtures and reduces consumption of electricity.

However, the higher total reflectance from bright dip and anodizing comes at a cost. Chemical brightening and electrochemical anodizing is costly in the form of process requirements for substantial electrical power, process chemicals, and process manpower together with the high cost associated with proper environmental disposal of the spent chemicals required in the bright dip and anodizing process operations.

Accordingly, a novel process is needed for providing higher total reflectance of aluminum sheet material to increase the efficiency of lighting fixtures and further to reduce consumption of electricity, to provide for enhanced formability of the sheet material without crazing, and to reduce high environmental costs.

INTRODUCTION TO THE INVENTION

Chemically brightened and anodized reflector substrate with sputter-deposited thin layers of silicon dioxide, aluminum, and titanium dioxide can provide TR and DI which are greater than 95%, while anodization imparts abrasion resistance to the reflectors. Although the BDA thin film product is superior to the silver laminated product, its commercial success is handicapped by the costly chemical processes of brightening and anodizing.

Thin film stacks of silicon dioxide $SiO_2$ or titanium dioxide $TiO_2$ are deposited on anodized aluminum to increase hardness and durability. However, the thin film stacks on bright dipped and anodized aluminum do not eliminate the costly requirements for process electrical power, process chemicals, and process manpower together with the high cost associated with proper environmental disposal of the spent chemicals required in the bright dip and anodizing process operations.

Technical efforts have been made to develop smooth inorganic coatings using chemical vapor deposition such as by $SiO_2$ vapor deposition, or by physical vapor deposition, as by nickel vapor deposition. However, the vapor deposition processes are found to be expensive, and further are found to be capable of application only to limited shapes and sizes of the substrates to be coated. The vapor deposition techniques also are known to have residual porosity.

Ohno et al., U.S. Pat. No. 4,348,463, disclose a reflector of a metal substrate, a resin layer disposed on the metal substrate surface, a light reflective metal over the resin layer, and a layer of a light transmitting crystalline ceramic over the reflective metal layer. The Ohno resin layer "does not release low molecular weight substances under vacuum and withstands the heat generated during a vacuum deposition operation of a ceramic material." The quoted limitation is essential in Ohno because both the light reflective metal layer and the crystalline ceramic layer are applied using vacuum deposition techniques. Examples of the vacuum ranged from $3 \times 10^{-6}$ Torr to $2.5 \times 10^{-5}$ Torr. It would be inconsistent with Ohno's requirement of vacuum resistance to replace the resin layer with a solvent-carried film. Ohno's vacuum conditions would remove alcohol and water, effectively destroying its function. The Ohno et al. solventless resin layer can include alkyl groups, and the number of functional groups in polymerizable groups is 2–3, i.e., X, Y, Z are 2–3.

Herrick, U.S. Pat. No. 3,410,636, discloses a reflector construction of an aluminum substrate, a coating of polymerized solventless alkyl siloxane varnish in contact with the substrate, and a reflective layer over the polymerized solventless varnish, Herrick calls for solventless polymerizable coating because solvents are described as causing shrinkage, such that any smoothing ability is lost with the use of solvents.

Blaich et al., U.S. Pat. No. 4,105,821, disclose a coated headlight reflector of a metal substrate which may be lacquered with a synthetic resin lacquer, such as alkyd melamine resin lacquer. A reflective metal layer and a transparent protective layer of hydrophobic silicon oxide are vacuum deposited over the lacquered metal substrate. A gaseous organosilicon is introduced, preferably including methyl and ethyl groups bonded directly to the silicon atom.

Grewal et al., U.S. Pat. No. 4,482,209, disclose an adhesive layer of either titanium or chromium deposited directly onto an aluminum alloy or brass alloy substrate, prior to depositing an intermediate layer of aluminum oxide and silicon oxide, a silver or aluminum reflector layer, and a protective layer of aluminum oxide and silicon oxide.

Matsushita, U.K. Patent Application 2,061,480, relates to a floodlight luminaire having high reflectivity. The luminaire includes an aluminum base metal, an undercoat of heat-resistant resin adjacent the metal, a vacuum-deposited aluminum layer over the undercoat, and a transparent protective film overlying the aluminum layer. Matsushita's resin undercoat is disclosed to be a silica glass which is disclosed to be nonessential and can be eliminated.

Linde et al., U.S. Pat. No. 5,043,789, disclose a silsesquioxane copolymer coating and insulating layer for semiconductors. A copolymer of aminoalkoxysilane is disclosed because the Linde et al polymer systems are so cross-linked as to need to plasticize the polymer. The high molecular weight, highly cross-linked condition makes it difficult to coat, e.g., more difficult to coat the substrate except in the spin on process described in the Linde et al. disclosure. Moreover, the aminoalkoxysilane is polar and reduces resistance to moisture.

Brown et al., Canadian Patent No. 662,670, disclose organopolysiloxanes. The Brown et al. siloxy units are linearly arranged using alkaline rearrangement catalyst for producing a white solid which then is dissolved in benzene. The polymer obtained is in the form of long white fibers. The solid is insoluble in methanol. Brown et al. call for a precopolymer of either diphenylsiloxy or siloxy containing alkyl, alkenyl, or cyanoalkyl radicals to produce solid (intrinsic viscosity in benzene), high molecular weight organopolysiloxanes having aryl radicals, but which also can have alkyl and alkenyl radicals.

Japanese patent application JO 1092-224-A by Mitsubishi Denki in its Abstract discloses phenylsilicone ladder polymer useful as interlayer insulation film on a semiconductor device.

It is an object of the present invention to provide material and method for increasing the total reflectance of aluminum sheet material.

Another object of the present invention is to provide a film coating for planarizing aluminum sheet material and increasing the reflectivity of a reflector layer overlying the film.

It is an object of the present invention to produce a polymer-coated reflector aluminum having enhanced total reflectivity.

It is a further object of the present invention to produce a polymer-coated reflector aluminum, in an economical and efficient manner and method, including for the application of the polymer coating.

It is another object of the present invention to provide for a reflector aluminum coated efficiently by a polymer coating process scaled up for any shape or size of reflector aluminum to be coated.

It is an object of the present invention to provide a method for synthesizing coatings which confer enhanced total reflectivity to reflector aluminum.

It is another object of the present invention to provide a product and method for providing increased total reflectivity aluminum without requiring high initial capital costs for producing the product or method.

It is another object of the present invention to provide a product and method for providing increased total reflectivity aluminum without requiring high environmental costs.

It is a further object of the present invention to provide for coating aluminum or to form a polymer-coated aluminum having planarized surfaces and increased total reflectivity higher than about 95%.

It is a further object of the present invention to provide for coating aluminum or to form a polymer-coated aluminum having planarized surfaces and increased total reflectivity higher than about 95% and color neutral properties.

These and other objects of the present invention will become apparent from the detailed description which follows.

SUMMARY OF THE INVENTION

The present invention provides a polymer-coated reflector aluminum and process for planarizing aluminum sheet material with polymer film and for increasing the reflectivity of a reflector layer overlying the film. A specified aromatic polysiloxane liquid polymer of the present invention preferably includes a non-linear, ladder-polymer aromatic polysiloxane such as provided by polyphenylsiloxane having the general formula $R_n SiO_{(4-n)/2}$, wherein R comprises a phenyl radical, and n has an average value of about 0.95 to 1.05.

The polyphenylsiloxane liquid polymer preferably is formed by providing an aromatic silane monomer, acid hydrolyzing the aromatic silane to form a hydrolyzed aromatic silane, and condensing the hydrolyzed aromatic silane to form a non-linear, ladder-polymer cross-linked polyphenylsiloxane liquid solution.

The polyphenylsiloxane liquid polymer solution is applied to aluminum as a liquid and then is dried onto the aluminum at a temperature in the range of about 75° C.–110° C. to form a polysiloxane polymer-coated aluminum having enhanced total reflectivity.

DETAILED DESCRIPTION

Figure 1:
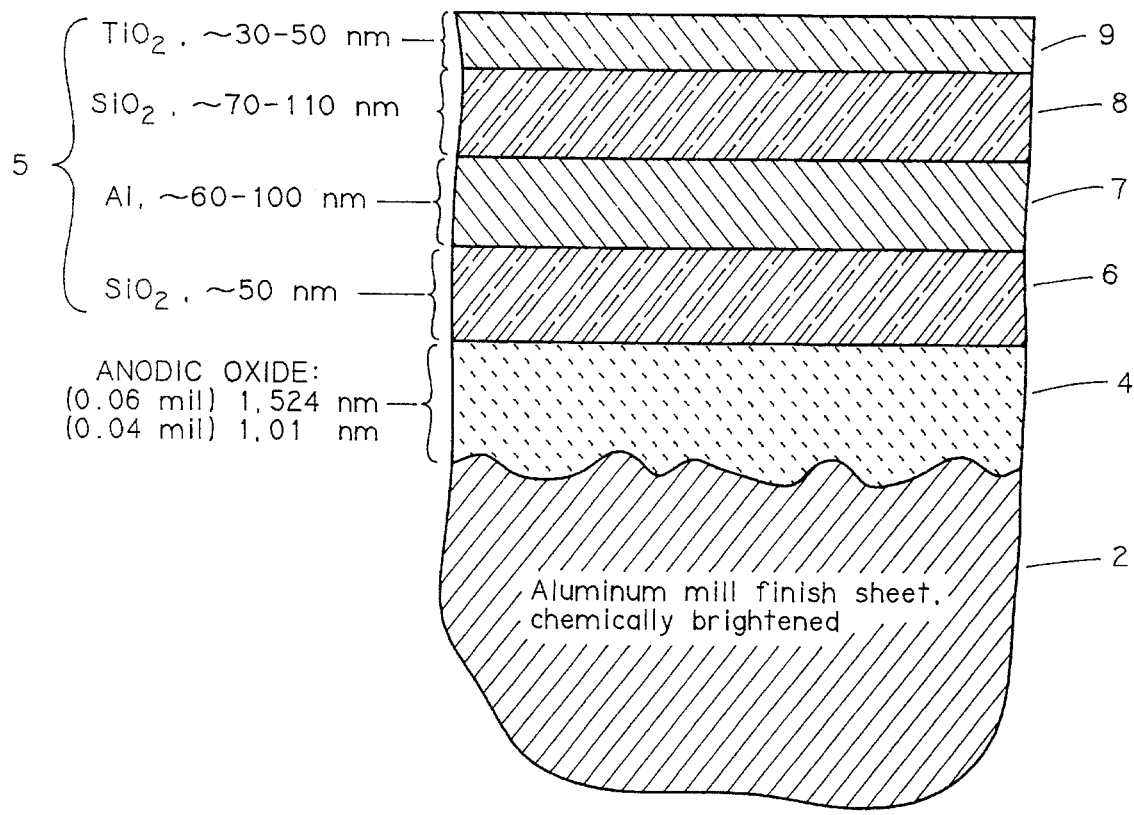
FIG. 1 depicts a prior art thin film stack on an aluminum alloy which has been processed by bright dip chemical treatment and anodized.

Referring now to FIG. 1, a conventionally brightened and anodized aluminum alloy sheet is provided with a reflector layer thin film stack deposition. Mill finish sheet 2 has a thickness of about 25 mils (635 microns). Anodic oxide coating layer 4 is formed on sheet 2 at a thickness of 0.04–0.06 mil (1,016–1524 nm).

Reflector layer 5 includes a first silica layer 6 having a thickness of approximately 500 Å (50 nm), an aluminum layer 7 having a thickness of approximately 600–1000 Å (60–100 nm), a second silica layer 8 having a thickness of approximately 700–1100 Å (70–110 nm), and a titania layer 9 having a thickness of approximately 300–500 Å (30–50 nm). As can be observed from an inspection of the Figures, layer dimensions are not to scale. All four layers 6, 7, 8, and 9 are applied by sputtering.

Figure 2:
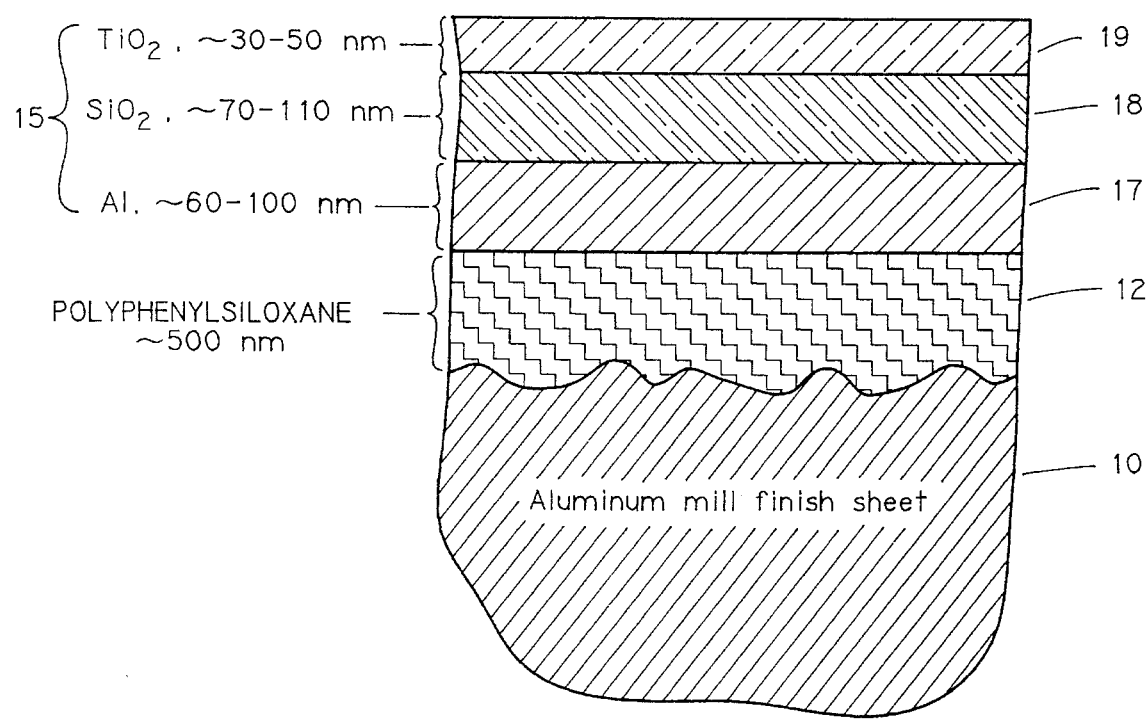
FIG. 2 depicts a thin film stack on an aluminum alloy which has been planarized in accordance with the present invention.

Referring now to FIG. 2, a mill finish aluminum sheet is provided with siloxane and reflector layer coatings in accordance with the present invention. Mill finish aluminum sheet 10 has a thickness of about 25 mils (635 microns). Before coating with siloxane layer 12, the sheet 10 had average surface roughness of about 40–50 nm. The siloxane layer 12 has a total thickness of approximately 500 Å (500 nm).

Reflector layer 15 includes an aluminum layer 17 having a thickness of approximately 600–1000 Å (60–100 nm), a silica layer 18 having a thickness of approximately 700–1100 Å (70–110 nm), and a titania layer 19 having a thickness of approximately 300–500 Å (30–50 nm). An optional first silica layer (not shown) underlying aluminum layer 17 and having a thickness of approximately 500 Å (50 nm) can be added but is not necessary. Layers 17, 18, and 19 are applied by sputtering.

The present invention includes applying the polymer coating of a polysiloxane liquid solution onto metal, i.e., including aluminum, and drying to evaporate a carrier solvent. The liquid carrier solvent can be dried at a temperature above room temperature, e.g., such as at a temperature preferably in the range of about 75° C.–110° C. The carrier solvent preferably can be provided by various proportions of an alcohol/water mixture, such as, in one example, 95% by volume isopropanol/water mixture.

The polymer coating of the present invention provides a film coating for planarizing the aluminum sheet material and for increasing the reflectivity of a reflector layer overlying the film.

It has been found that the present invention requires a polymer coating of aromatic siloxane, polysiloxanes other than aromatic siloxane polymers, i.e., such as alkyl, vinyl, or amine polysiloxanes, do not produce the desired properties provided by the aromatic polysiloxane required in the process and composition of the invention.

The specified aromatic siloxane polymer coating can be prepared by a starting material of aromatic silane which is then hydrolyzed and then chemically condensed to form a cross-linked aromatic siloxane liquid polymer. The resulting composition is used to produce a polymer-coated aluminum metal sheet having superior total reflectance. Superior total reflectance is defined as having a total reflectance TR greater than or equal to ($\geq$) about 95%.

The present invention preferably includes a polyphenylsiloxane as the specified aromatic polysiloxane polymer, preferably, the polyphenylsiloxane polymer comprises a compound having the general formula $R_nSiO_{(4-n)/2}$, wherein R comprises phenyl radical and n has an average value of about 0.95 to 1.05.

Silicon-containing polymers represented as shown in the general formula $R_nSiO_{(4-n)/2}$ are found over the range of n=0–4. The significance of n relates to silicon functionality (X). Three dimensional cross-linked polymers are obtained from monomers at least some of which possess a functionality exceeding two (2). Cross-linked polymers are defined, as such, as those containing units some of which are "polyfunctional," this term being reserved for functionalities exceeding two (2).

When n=0, this represents the case of silicon dioxide. Silicon dioxide (n=0, X=4) is not easily solubilized and is most often applied using vapor deposition methods.

The case of n=1 represents a silsesquioxane system, and these system are referred to herein as ladder-like or ladder polymer structures. The ladder polymer structures are two dimensional and are easily solubilized.

Another method of representing silicon chemistry is to use the functionality, X. When X=2 (n=0), there is linear chain formation, i.e., one dimensional linear growth.

Cases for which the functionality X is greater than two (2) represent systems where cross-linking, i.e., three dimensional growth, takes place. Such systems where three dimensional growth takes place have a gel point. This gel point is the point where the solution viscosity becomes so large that reactants cannot diffuse to reaction sites and thereby suffer from incomplete reactions. Gelation also compromises shelf life and stability and renders them hard to solubilize. Correspondingly, incomplete reaction leads to problems of outgassing at elevated temperatures. The ladder structure of the polyphenylsiloxane polymer of the present invention, wherein it is required that n= about 0.95 to 1.05, represents a two dimensional structure and differentiates the preferred polyphenylsiloxane of the present invention from three dimensional cross-linked structures. Accordingly, the ladder structure specifies a particular definition of the non-linearity of the preferred heterocyclic polymeric siloxane coating composition of the present invention.

It has been found that polydiphenylsiloxane polymers (which have an n value higher than the specified n value of about 0.95 to 1.05 ) do not supply the properties desired in the present invention as provided by the polyphenylsiloxane polymer-coated aluminum metal sheet, i.e., coated with the polysiloxane of the formula $R_nSiO_{(4-n)/2}$, wherein R preferably comprises phenyl radical, and n has an average value of about 0.95 to 1.05.

The preferred polyphenylsiloxane polymer of the specified formula has been found to provide the desired total reflectance and formability and stability produced and provided by the process and composition of the present invention.

The present invention produces a polymer-coated aluminum metal sheet through the steps of providing the polyphenylsiloxane liquid polymer solution polymerized to have non-linear, ladder silicon to oxygen bonding, and coating the aluminum metal sheet with the polyphenylsiloxane liquid polymer solution to form a polyphenylsiloxane polymer-coated aluminum substrate.

The specified polyphenylsiloxane polymer can be provided by a starting material supplied by an aromatic silane monomer having one phenyl moiety. Preferably, the phenyl moiety is pendant on the silicon. The preferred starting material monomer is phenyltrimethoxysilane.

The aromatic silane monomer is hydrolyzed, e.g., by acid hydrolyzing, to form a hydrolyzed aromatic silane which then is condensed to form a cross-linked aromatic polysiloxane. The aromatic polysiloxane polymer preferably has a cross-linked structure to provide non-linear silicon to oxygen bonding, more preferably non-linear, ladder silicon to oxygen bonding wherein the phenyl moiety is pendant on the silicon.

Accordingly, the aromatic polysiloxane polymer contains a compound having the general formula:

$$R_n SiO_{(4-n)/2} \tag{1}$$

wherein

R comprises phenyl radical, and n has an average value of about 0.95 to 1.05.

More preferably, R consists essentially of phenyl radical with n having an average value of about 0.95 to 1.05.

The polyphenylsiloxane polymer displays two dimensional cross-linked ladder structure of the non-linear preferred hetero-cyclic polymeric siloxane coating composition of the present invention.

The polyphenylsiloxane liquid polymer solution is applied to the aluminum metal sheet by coating the aluminum metal sheet with the liquid solution and then drying the carrier solvent, thereby to deposit the liquid polysiloxane polymer onto the aluminum metal sheet. The drying step should take place at a temperature above room temperature, e.g., at a temperature in the range of about 75° C.–110° C., more preferably in the range of about 90° C.–105° C.

Prior to coating with the phenylsiloxane liquid solution, the aluminum metal sheets preferably are cleaned with one or more solvents. The cleaned aluminum metal sheet then can be coated with polysiloxane polymer solution which will adhere directly to the aluminum metal sheet.

In accordance with the invention, there is provided coated metal sheet material having improved reflectivity. The material preferably comprises a base layer of aluminum or an aluminum alloy, a film overlying the base layer and a reflector layer overlying the film. We have found that reflectivity can be improved significantly by applying the polyphenylsiloxane film to reduce surface roughness.

The aluminum sheet material is generally produced from aluminum, e.g., 99% purity or higher, or from an alloy of aluminum and manganese or an alloy of aluminum and magnesium. For example, AA1000, AA3000, or AA5000 aluminum can be used. The sheet material ordinarily has a thickness of about 500–800 microns. Prior to treatment in accordance with the present invention, the sheet has average surface roughness of greater than about 20 nm and usually about 40–50 nm.

Surface roughness of the sheet material is reduced by application of the film comprising polysiloxane in accordance with the present invention. The film may be applied to the sheet material as a siloxane polymer solution. The preferred siloxane polymer is polyphenylsilsesquioxane in accordance with the present invention. Evaporation of the solvent from the solution leaves the film.

In accordance with the present invention, the specified siloxane coating develops a coating pretreatment for aluminum alloy sheet to planarize, smooth, and level the substrate.

The siloxane coating of the present invention replaces chemical brightening and anodizing of the aluminum sheet, normally used as pretreatment to impart hardness and scratch resistance to aluminum thin film product currently produced from bright dipped and anodized (BDA) aluminum alloy substrate sequentially coated with $SiO_2$, Al, $SiO_2$, and $TiO_2$ dielectric films. The siloxane planarizing procedure of the present invention eliminates the chemical brightening and anodizing steps, eliminates inadequate planarization and blue haze concerns, and significant cost savings with color neutrality are provided.

The material and method of the present invention replace chemical processes described above undertaken to achieve high levels of planarization, as is the case for the laminated silver product.

We have found that siloxane-coated reflector aluminum sheet material and method of the present invention provide parity in pricing with the laminated silver reflectors which was not available with prior thin film reflectors. The siloxane-coated reflector aluminum sheet material and method of the present invention reduce the cost of the thin film reflectors by reducing the number of processing steps. The siloxane-coated reflector aluminum sheet material and method of the present invention eliminate the costly chemical brightening and anodizing steps, currently requisite in the processing of the thin film reflectors, through the use of the specified siloxane coating of the present invention as a protective planarizer.

The environmentally safe siloxane process of the present invention, as a pretreatment for the thin film lighting sheet, is estimated to cost between $0.40 to $0.44 per pound aluminum sheet ($0.13 to $0.17/ft$^2$ of 0.20 in. gauge aluminum sheet). Costs for the conventional brightening and anodizing processes range between $0.87 and $1.16/lb. aluminum sheet, ($0.29 to $0.42/ft$^2$ aluminum sheet, 0.020 in. gauge). A coating cost savings of $0.16 to $0.25/ft$^2$ of 0.020 in. gauge aluminum sheet or $0.47 to $0.72/lb. aluminum sheet could be realized by replacing the conventional brightening and anodizing process with the sol-gel process for the thin film lighting sheet product.

In the production of the thin film product, the initial sputtered layer, silicon dioxide, which is required to promote adhesion of the remaining thin film stack on brightened and anodized sheet, is eliminated when using a siloxane planarizing and leveling layer. Therefore, the estimated cost of the thin film application is reduced further by as much as 17%.

The higher cost of bright dip and anodizing processes, referred to by the acronym BDA, is attributable to the need for several accessory processes necessary for the production of a bright, reflective and very durable aluminum surface. The processes, as defined here, are used mainly for batch work but also are used in the continuous processing of aluminum coil. Specifically, the processing order for BDA encompasses the following steps: 1. Surface cleaning, 2. Chemical brightening, 3. Anodizing, and 4. Sealing. Preparation of BDA samples as a substrate for thin film depositions require an additional process step: 5. Desmut.

Surface cleaning removes oil, dirt, and grease from the aluminum surface resulting from fabrication and/or transportation and storage. Cleaning is accomplished by vapor degreasing or solvent wiping if the surface is heavily oiled, followed by immersing the aluminum in an inhibited alkaline cleaner, rinsing in cold water, then immersing in a mild acid cleaner and rinsing finally in cold water.

Chemical brightening, also referred as "bright dip," is used where a bright and specular finish is required and buffing or electropolishing are not convenient or economical. Specifically, the bright dip employs a hot solution comprising phosphoric acid and certain additives, with a dipping period of about ½ to 5 minutes. With bright dip, very good surface leveling and brightening can be obtained on most commercial wrought alloys.

Anodizing electrolytic process produces an oxide coating on aluminum and its alloys for both protective and decorative purposes. The anodizing process produces a hard, adherent, protective, and transparent coating of aluminum oxide, 0.08 or 0.06 mil thick, on the brightened aluminum surface. The protective and clear oxide coating is produced in a solution containing 15 wt. % sulfuric acid. The oxide coating thickness is produced in electrochemical proportion to the electric current employed, or to the time of coating if the electric current remains constant. The sulfuric acid electrolyte must be cooled to maintain a temperature of 68°–72° F. to maintain the hardness and transparency of the oxide coating. The oxide last produced is always between the metal and the previously produced oxide. As a result, the outer surface of the oxide coating is in contact with the sulfuric acid electrolyte from the start. The electrolyte has some solvent action on the oxide coating which, in combination with the passage of electric current through the oxide, causes formation of predictable submicroscopic pores in the oxide coating. The pores are too small, approximately 120 Angstroms in diameter, to be seen with a light microscope. There may be as many as one trillion pores per square inch. They are large enough, however, to permit the entrance of aqueous solutions.

Sealing is applied to treat and make the porous aluminum oxide coating formed in the anodizing process impermeable, non-adsorptive, and nonstaining. The oxide coating, being porous, lowers the coating's resistance to corrosion and permits undesirable staining and coloring. Sealing may be accomplished in a number of ways; the selection of the method is dependent upon the article being sealed and the service to which it will be subjected. Generally, sealing is accomplished by treating anodized surfaces in hot water. Addition of nickel acetate to the hot water increases the resistance to corrosion and general chemical attack of the oxide coating. Nickel acetate allows for lowering of the sealing bath temperature and treatment time. The sealing process converts the aluminum oxide to a hydrated aluminum oxide resembling Boehmite, an aluminum oxide hydrate, ($Al_2O_3$—$H_2O$). The conversion to an aluminum oxide hydrate is accompanied by an increase in the volume of the coating which allows for the closing of the pores in the oxide coating. Sealing in a nickel acetate solution causes additional precipitation of colloidal nickel hydroxide within the pores of the oxide coating. Nickel acetate sealing, however, produces a loose powdery sealing smut on the surface which, if not removed, interferes with the adhesion of the thin film stack on the sealed oxide coating.

Desmut is necessary in the preparation of the anodized and sealed substrate for the thin film to remove the visible layer of a powdery surface deposit on the oxide coating that is a result of the sealing process. The deposited smut is composed of nickel hydroxide and aluminum oxide hydrate, ($Al_2O_3$—$H_2O$). Removal of the smut is accomplished by immersing the anodized and sealed surface into a 15 or 20 wt.% sulfuric acid anodizing electrolyte at 80° F. for 1–3 minutes. Immersion in the acid is followed by a cold water rinse and physical wiping of the anodized surface with a clean soft cloth under constantly running deionized water. The desmutted surface is finally dried by impingement with warm dry air.

The bright dip can be provided by phosphoric and nitric acids between 70–80 wt. % and 2–4 wt. %, respectively. Copper is added to enhance the final brightness by depositing in the valleys and enhancing dissolution of the peaks. The solution is used at 190°–200° F. with vigorous agitation.

In a cost comparison for siloxane-processing and conventional processing as pretreatments for thin film lighting sheet, the siloxane-processing range costs are between $0.40 to $0.44/lb. aluminum sheet, ($0.13 to $0.17/$ft^2$ of 0.020 in. gauge aluminum sheet). Processing costs for conventional chemical brightening, anodizing, sealing and desmutting range between $0.87 and $1.16/lb. aluminum sheet, ($0.29 to $0.42/$ft^2$ aluminum sheet, 0.020 in. gauge).

Substrate process costs using siloxane technology are only a third of the costs associated with conventional anodizing processes. When siloxane is used instead of BDA, the substrate will not require the silicon dioxide thin film processing steps. The siloxane process is more environmentally safe than BDA, eliminating the need for the type of hazardous chemicals typically found in BDA processing.

Another benefit of the specified siloxane coating of the present invention as protective planarizer is the elimination of certain environmental distaste associated with the chemical brightening and anodizing steps.

The siloxane-coated reflector aluminum sheet material and method of the present invention is efficient since it is a low temperature procedure.

We have found further that the siloxane-coated reflector aluminum sheet material and method of the present invention overcome several disadvantages normally associated with alkoxide precursors prone to room temperature hydrolysis reactions. The alkoxide formulations undergo continual chemical changes, a fact that undermines the shelf life of the coatings. In turn, the limited shelf life renders the process wasteful. A related problem is that the continued reaction makes reproducibility difficult to realize.

In the synthesis and evaluation of the specified silsesquioxane coating formulation of the present invention as a protective planarizer for thin film reflectors, the siloxane-coated reflector aluminum sheet material and method of the present invention is provided by oligomerizing the silanes through an elevated temperature hydrolysis and condensation step prior to coating the substrates. These modifications dramatically improve the shelf stability of the formulations and the reproducibility of the coating, which are akin to the spin-on-glass (SOG) method that is used in the electronics industry.

The polymer-coated sheet material is rendered reflective by successively applying coatings of silica, metal, silica, and titania. The optional first silica layer may have a thickness of about 200–2000 Å and is about 500 Å thick in one preferred embodiment. The metal layer is preferably aluminum. The aluminum layer has a total thickness of about 500–2000 Å, preferably 600–1000 Å, and is about 1000 Å thick in a preferred embodiment. A second silica layer is applied over the aluminum layer to a total thickness of about 500–2000 Å, preferably 700–1100 Å, more preferably about 700 Å. Finally, titania is applied over the silica to a thickness of about 200–2000 Å, preferably 300–500 Å, more preferably about 450 Å. The gel film and reflector layer together have a total thickness of approximately 3150–7650 Å.

The silica, metal, silica, and titania layers are all applied by sputtering in the particularly preferred embodiment described herein. Alternatively, these layers may be applied by evaporation, chemical vapor deposition, or other preferred coating techniques.

The coating of the present invention can be applied to the aluminum metal substrate by spin-coating, dip- or roll-coating. While spin-coating is more prevalent in other areas, e.g., in the electronics industry, it is impractical to use for continuous coil substrates. Thus dip-coating and roll-coating are the methods of choice for continuous coil coating. Of these two methods, dip-coating is preferred.

The use of a siloxane coating in place of the anodic oxide also provides a durable substrate for thin film applications, and siloxane coatings eliminate the crazing and blue haze phenomena or color neutral problems.

Bench scale experiments were conducted to produce siloxane-coated samples as substrates for the thin film prototype. The properties of the siloxane-coated samples were compared to commercially available lighting sheet products and to coil-anodized lighting sheet products. Results indicate that the siloxane-coated 5657 and 3003 samples had preferred formability and had comparable or preferred durability. In addition, the siloxane-coated samples with the thin film stack exhibited no iridescence or blue haze.

EXAMPLE I

A sheet of aluminum 5657 alloy (AA series) had an initial surface roughness of about 40–50 nm. A 20 wt. % solution of phenyltrimethoxysilane dissolved in 95% isopropanol and 5% water was acidified with glacial acetic acid to produce a pH of about 4.5. The acidified solution was heated for 5 hours at 80° C. to form a solution containing siloxane oligomers. The solution was then coated onto the aluminum sheet to form a thin solution film. The sheet material was then heated to a temperature of about 105° C. Average surface roughness of the aluminum alloy sheet covered with the film was reduced to less than about 20 nm.

A reflective coating stack was applied over the film by successively sputtering layers of silica, aluminum, silica, and titania. The first silica layer had a thickness of about 500 Å, and it improved adhesion of the aluminum layer to the film. The aluminum layer was about 1000 Å thick. The second silica layer applied over the aluminum was transparent, with a thickness of about 700 Å. The titania layer applied over the second silica layer was transparent with a thickness of about 450 Å. The titania layer had a higher index of refraction than the second silica layer.

Before treatment as described above, the sheet had distinctness of image (DI) values of about 95% and total reflectance (TR) of about 30%. Total reflectance readings were obtained using an integrating sphere reflectometer such as a Diano Corp. TR-1 or Technidyne TR-2 in accordance with ASTM D-78. Distinctness of image value was measured on a Dori-Gon gloss meter in accordance with ASTM E430 wherein a beam of light was directed onto the sheet surface at an incident angle of 30°, and the relative amount of light reflected at 10 minutes from the specular angle is used to calculate a DI value.

Aluminum alloy sheet material coated in accordance with the procedure described above had an improved DI value of about 97%. Total reflectance was increased to about 96%.

EXAMPLE II

The oligomeric polyphenylsiloxane coating formulation of the present invention was prepared in a solvent carrier of alcohol and water. The pH of a 19:1 (v:v) reagent-grade isopropanol-water stock solvent mixture was adjusted to a value of 4.5 using reagent grade acetic acid. Phenyltrimethoxysilane (PTS) monomer obtained from Huls of America, Bristol, Pa. was added to the stock solvent to give a 20% (w/w) solution. Subsequent refluxing (80° C.) for 5 hours followed by cooling to room temperature produced the oligomerized siloxane solution, which was stored in plastic containers.

Polymethylsilsesquioxane (PMSO) and Polydiethoxysiloxane (PDS) obtained from Huls of America, Bristol, Pa. were dissolved in isopropanol to afford 1.25% (w/w) concentrated solutions of PMSO and PDS, respectively.

Dip-coating runs were carried out using a Gardco Dip-Coater Model B (A. G. Gardner Company, Inc. Pompano Beach, Fla.). In all cases, the substrates (aluminum alloy 3003) were immersed at a rate of 20 in./min and allowed to settle (about 1 minute) following which, the substrates were withdrawn at various speeds (2, 6, 10 in./min) and held above the liquid to complete drainage. The coated samples were dried at 105° C. overnight. To facilitate cross linking, the substrates were exposed to a heat soak at 300° C. for 1 hour.

The thin film stack, consisting of a $SiO_2$ underlayer, an Al reflecting layer, and a $SiO_2$—$TiO_2$ bilayer to enhance the reflectance, was deposited by sputtering. The thickness of the various layers were selected to maximize the reflectance over the visible spectrum while minimizing coloration.

The samples dip-coated at the various rates in the siloxane solutions, after drying, heat soaking, and overlaying with the thin film stack, were evaluated for optical performance.

Total reflectance values were obtained with the Technidyne TR-2 standardized with an aluminum first surface mirror. The aluminum first surface mirror standard had been calibrated to a perfect mirror reference. Measurements were obtained on three areas of each sample. The values obtained for total reflectance from the areas were consistently ±0.1 unit, within the acceptable region of instrumental error.

The Hunter Laboratories D-47 DORI-Gon gloss meter was used to obtain the values of distinctness of reflected image on the siloxane thin film coated samples in accordance with the ASTM E-430 Method. The DORI-Gon was standardized with an aluminum first surface mirror, which had been previously calibrated against a perfect mirror reference.

Measurements were obtained with the incident beam aligned parallel and also transverse to the rolling direction of the aluminum substrate. The transverse and parallel values were then averaged in order to arrive at a true indication of the image clarity at that particular location on the sample surface. Using this procedure, readings were taken at three areas on each coated sample, which were then used to calculate the distinctness of reflected image representative of the sample as a whole.

Figure 3:
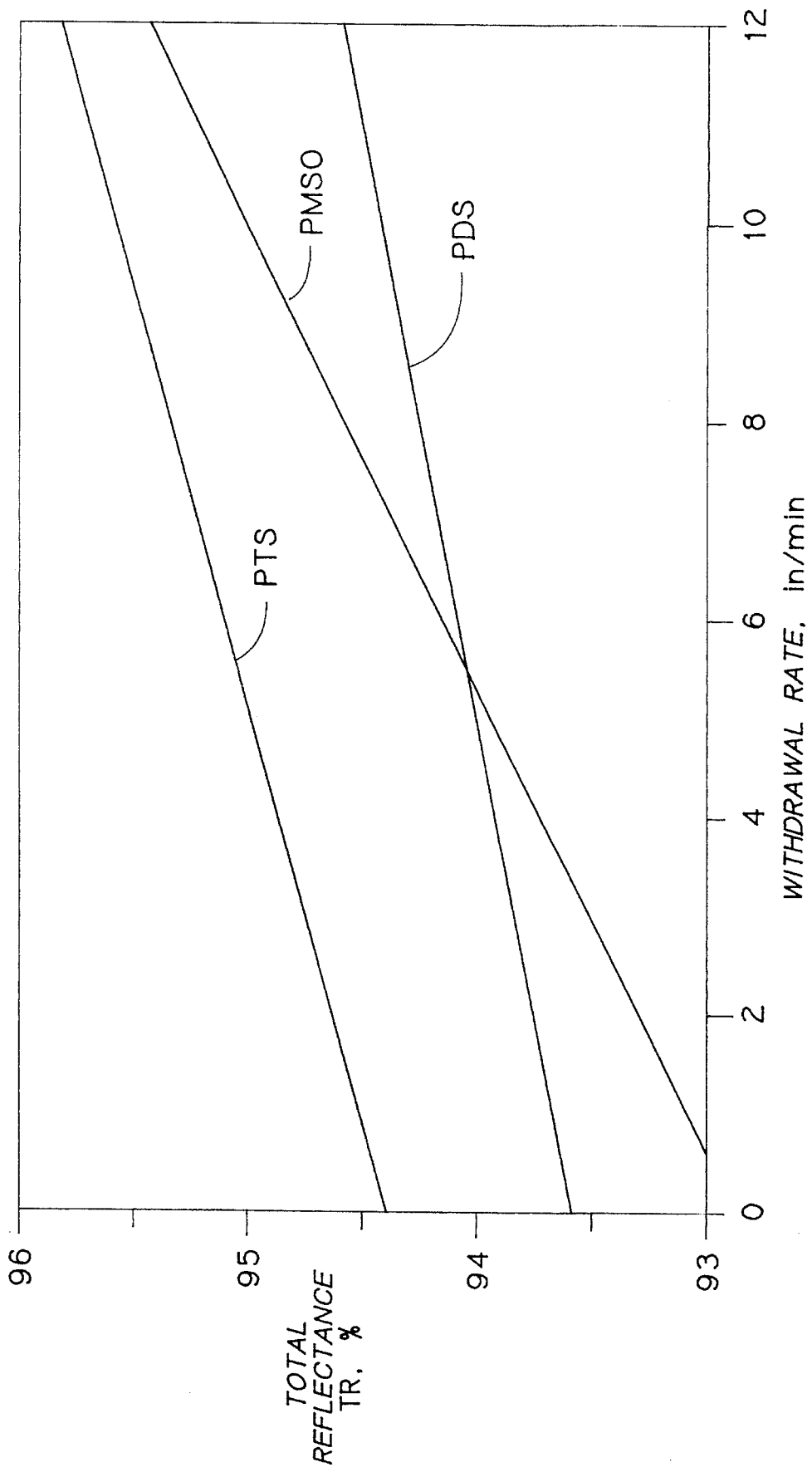
FIG. 3 is a graphical depiction comparing total reflectance (TR) of substrates planarized with siloxane coatings prior to thin film stack deposition.

Results were superior in TR for PTS over PMSO and PDS and are shown in FIG. 3.

The film stack also provided corrosion resistance against humidity and good abrasion resistance when deposited on a hard underlayer.

EXAMPLE III

The siloxane planarizing and leveling coating of the present invention at a level of 20 vol.% PTS (phenyltrimethoxysilane) was continuously roll-coat applied to bright-rolled, mill finish AA5657 and AA3003 aluminum alloy coil on a continuous coil line. Curing was achieved in conventional forced air ovens, while the sintering of the siloxane coating, necessary to obtain hardness, was achieved with infrared radiation. Though at times the coating temperature approached 800° C., as measured by infrared thermometer, for very short durations (10–30 seconds) during the infrared sintering operation, the metal properties were not affected.

Siloxane roll-coated samples were obtained from continuous coil, infrared sintering trials, and a thin film stack was applied. These samples performed comparably in terms of optical properties, formability, and durability to a thin film stack applied to brightened and anodized aluminum sheet; to high end lighting sheet retrofit silver film product; and to a thin film stack on Alanod produced aluminum sheet.

EXAMPLE IV

A continuous coil prototype experiment was conducted to determine if siloxane scaled-up to continuous processing would provide properties comparable to batch-processing. A one-side bright 5657 alloy coil (6 in. wide, 0.0235 in. gauge) was cleaned in Novamax 120 alkaline solution at 60° C. prior to roll coating with the polymer. The time in the cleaner was varied between ½ and 3 minutes to produce a water-break free surface with no visible surface etch. Two sol-gel formulations were tried: 20 vol. % phenyltrimethoxysilane (PTS) and 1.5 vol. % polymethylsilsesquioxane (PMSO).

Several coater settings to control wet coating thickness were used. Cure times were varied between 1 and 3 minutes at a constant oven temperature of 125° C.

The 5657 20 vol. % PTS coated, thin film stack produced from the continuous coil siloxane-coated metal had optical properties equivalent to a batch scale process, better formability, and equivalent durability. In addition, the first sputtered $SiO_2$ layer, which was thought to aid the adhesion of the subsequent sputter deposited aluminum layer, was determined to be unnecessary, based on the durability data.

The 1.5 vol.% PMSO coated samples had low optical properties and failed humidity testing. This failure is attributed to the inherently low solids of the coating, which led to relatively thin siloxane coatings.

A second continuous siloxane altered the PTS chemistry and cure to obtain higher thin film product hardness. Two 6 in. wide coils of 5657 and 3003 sheet, both processed with typical one-side bright rolling practice, were used. The 5657 was 0.020 in. gauge, and the 3003 was 0.0235 in. gauge.

The coils were cleaned for ½ minute in Novamax 120 solution at 60° C., resulting in a water-break free surface with no visible surface etch. The 20 vol.% PTS siloxane coating, formulated with lower water and higher alcohol content than the coating used in the first continuous coating trial, was applied via roll coat at a constant line speed of 20 fpm on an experimental coil line. A maximum line speed of 30 fpm was investigated. The siloxane was cured in a convection oven to a peak metal temperature of about 60° C., cooled and rewound. The cure at this temperature was sufficient to prevent blocking or mottling of the coating in the rewound coated coil, but insufficient to impart the desired degree of hardness.

The final cure and sintering of the siloxane-coated coils were obtained with infrared heaters.

Further, to facilitate benchmarking, two commercially available spin-on-glass (SOG) coatings were evaluated for the same purpose. In all cases, the coatings were applied in accordance with statistically designed dip-coating variables.

Bench scale tests indicated that the siloxane-coatings could be cured and sintered by infrared radiation at surface temperatures up to 425° C. for AA5657 and as high as 800° C. for AA3003 alloy without affecting the mechanical properties of the metal. The dwell time at the higher temperatures was less than 10 seconds. Line speeds between 25 and 100 fpm and coated metal surface temperatures from 380° to 760° C. were investigated.

The rapid and elevated temperature cure imparted a higher degree of hardness to the final product.

The siloxane coatings do not require curing and sintering on two separate lines. Mechanical properties were not adversely affected by the infrared energy.

The siloxane-coated reflector aluminum sheet material and method of the present invention eliminate the gap between the optical total reflectance and distinctness of image properties of currently available commercial bright dip and anodized aluminum sheet and laminated silver film reflectors.

When the aluminum sheet has been planarized in accordance with the present invention through a dip coat and subsequently sputter-coated with a thin film stack, the interaction between the dip coated and sputtered layers involve the dip coating variables, principally withdrawal speed (S), and affect the total reflectance TR and distinctness of image DI of the substrates.

The TR and DI values are influenced by the extent of planarization. The degree of planarization will, in turn, be affected by the physicochemical (alloy) constitution of the substrate, by withdrawal speed S, and by the type of coating. Thus for the same alloy, withdrawal speed S and the type of coating influence the planarization level and hence the optical properties.

Alloy 3003 was used to investigate the effects of S, coating type, and their interaction, if any, with the thin film stacks on the TR and DI.

The optical characteristics of reflector material have a significant impact on the effectiveness with which light direction and high luminaire efficiency can be achieved. Typically, the optical quality of the reflectors is characterized by their TR and DI values.

In reflector materials, the TR will directly impact luminaire performance. TR is the ratio expressed as a percentage of reflected flux (in all directions) to incident flux. As such, TR represents the ability of a material to reflect incident light in any direction (as opposed to absorbing that light).

$$TR = Flux_R/Flux_I \times 100\% \qquad (2)$$

Distinctness of image provides a measure of image clarity and is a percentage indicator of the amount of incident light reflected from materials relative to some standard. DI of a metallic surface can also be expressed as a percentage of the Specular Reflectance Equation (4) of the specimen being measured. Specular reflectance ($R_s$) is a measure of the incident light reflected at the specular angle ($\approx 30°$), relative to that reflected by an ideal perfect mirror, ($R_o$).

$$R_s = R_{30°}/R_o \qquad (3)$$

Distinctness of Image, therefore, is the sharpness of the reflected image as measured by the ratio of the reflectance at 0.3° from specular to the reflectance at the specular angle as indicated in Equation 4.

$$DI = ((R_s - R_{0.3})/R_s) \times 100\% \qquad (4)$$

Thus, DI is zero for a perfect diffuser and 100 for a perfect mirror.

An anodized aluminum alloy substrate for thin film depositions for enhancing optical performance can be brittle, can craze when formed, and can require desmutting prior to thin film deposition.

The bright finishing process influences the surface roughness of the substrate. For example, the Alcoa Phosbrite™ bright-dip process for pretreating the substrate produces less surface roughness than a standard industrial bright-dip process. Replacing standard industrial bright dip processes with the Alcoa Phosbrite™ process eliminates blue haze on the thin film product by reducing the surface roughness of the pretreated substrate.

The Phosbrite™ process includes phosphoric, nitric, and sulfuric acids and uses chemical polishing at high concentration of copper at a temperature between about 205°–220° F. with vigorous mechanical agitation.

When aluminum is placed in a hot bright dip solution, the nitric acid reacts with the aluminum to form a film of aluminum oxide. This film is immediately dissolved by the phosphoric acid. These reactions occur more rapidly at the peaks than in the valleys because the bright dip solution is very viscous. There is less agitation in the valleys than at the peaks. Therefore, the rate of reaction in the valleys decreases as the solution becomes saturated with aluminum phosphate, and the nitric acid is depleted.

The preferential attack of the bright dip at the peaks is enhanced by the addition of copper to the solution. During bright dipping, a galvanic cell is set up between aluminum and copper. The copper will plate out on the aluminum surface. This film of copper, like the film of aluminum oxide, forms and dissolves faster at the peaks than in the valleys. The film plated in the valleys protects the aluminum from further attack. Maximum brightness is obtained with the addition of copper with minimum metal removal.

The relatively high concentration of copper in the Phosbrite™ solution, when used in a continuous coil process line, causes excess copper to plate out on the aluminum surface. The plated copper must be physically removed from the coil sheet by a continuous wiping process. The higher copper also makes for more efficient metal removal and a more level surface, such that a "blue haze" evident after anodizing and application of the thin film stack was reduced.

Blue haze on thin film reflector sheet refers to lighting fixtures made from thin film stacks deposited on aluminum alloy, chemically brightened, anodized to 0.08 or 0.06 mil oxide, sealed and desmutted, and seen to have a "blue haze" when viewed at certain angles. The blue haze does not affect the optical properties nor the efficiency of the fixture. However, it is a significant cosmetic defect.

We have determined that surface roughness at the top of the anodic oxide film is the cause of the blue haze. Diffuse scattering is directly related to surface roughness. Experimental and theoretical evidence demonstrate that shorter wavelengths (blue light) are more effectively scattered by surface imperfections. Thus, the topography at the top of the anodic oxide results in preferential scattering of blue light. The diffuse scattering of blue light results in a blue haze on the sample under conditions which maximize the amount of diffuse light collected by the human eye.

A sample which is color neutral at both normal incidence and grazing angles can be produced.

Electropolished and high purity metal allow for a comparatively smooth anodic oxide. A thin film stack deposited on such a smooth oxide surface results in a product with little or no blue haze.

We have found that coating type, the dip coating withdrawal speed (S), and the thin film stack (T), have a significant effect on the TR and DI values. In the absence of a thin film stack, increasing the rate of withdrawal speed (S) decreases TR. The presence of a thin film stack has a positive effect on TR, with a smaller magnitude.

In the case of DI, unlike that for TR, S has a positive effect. T, on the other hand, has a much smaller negative effect. We have found that S is the predominant factor in determining the value of DI.

A value of 95% TR and also DI was provided by a combination of a thin film stack and higher values of S as necessary to make PDS an acceptable planarizing formulation.

The Yates standard algorithms for PMSO are derived from the TR data. S has a small negative effect on TR while T is positive and large. The interaction between PMSO and the substrate is identical to that exhibited by PDS, as does the interaction between PMSO and the thin film stack. Hence, the performances given for PDS are also applicable for PMSO.

Thus, in the case of DI, all terms (S, T) are positive. Moreover, S attains more significance than the thin film term (T).

Finally, with respect to the 95% level for both TR and DI, this value can be attained by working at higher S values. Empirical observations involving withdrawals at 20 in./min attained the 95% level for both TR and DI.

The TR values for PTS coating at different withdrawal rates and the resultant Yates algorithms for TR and the defining relationships reveal that both S and T have a positive effect on TR, T having the predominant effect. The positive effect of S displayed by PTS is in contradistinction to the PDS and PMSO cases, where S has a negative effect. This observation was noteworthy since it provided the ability to coat at much higher speeds and suggested that the interaction of PTS with the substrate is positive. Further, it can be seen that the interaction between PDS and PMSO with the substrates is not as favorable as that for PTS. Although the interaction between S and T has a much smaller effect, it is significant since, contrary to the cases for PDS and PMSO, it has a negative effect suggestive of a noncoherent interaction between PTS and the thin film stack.

Increasing S has a positive effect on TR. It can be seen that in the case of PTS, the effects of S, T and ST on DI are positive. Thus, for PTS, S has a positive effect for both TR and DI unlike the reversing situations exhibited by PDS and PMSO. The positive nature of the interaction between PTS and the substrate renders PTS more suitable for coating at high speeds.

The level of 95% for TR and DI values shows the inadequacy of the withdrawal rates. Higher withdrawal rates are necessary. In a high-speed roll coating, PTS had acceptable TR and DI values.

We have observed the effects of coating formulation, dip-coating variables, and a sputtered thin film stack as follows. For PDS and PTS, the linear models are adequate. The linear model is not as applicable for PMSO. For PDS and PMSO, the effect of speed on TR and DI is negative, but this effect is swamped by positive confounding interaction between speed and the thin film stack process. This observation renders these coatings to be suitable for low rates of coating. For all withdrawal rates, PDS displayed acceptable ($\geq$95%) TR, but inadequate (<95%) DI values. At the higher coating rates, PMSO exhibited acceptable TR and DI values.

PTS, on the other hand, had a positive additive effect between S and T, which points to this formulation as being more suitable for high speed coating processes.

We have found further through bench scale experiments that 20 vol.% PTS (phenyltrimethoxysilane) is preferred over 1.5 vol.% PMSO (polymethylsilsesquioxane). Increasing the PDS and PMSO concentration beyond 1.5% compromises formability. The thin film product using the 20 vol.% PTS siloxane as the aluminum sheet pretreatment performed equivalently to the thin film product in which the pretreatment consisted of chemical brightening and anodizing. Results from accelerated weathering tests, formability tests, and optical property measurements indicated that the siloxane pretreatment is a viable pretreatment alternative for BDA in the thin film product.

The present invention provides a highly reflective product by vacuum deposition of a series of thin films onto an aluminum substrate. The aluminum substrate requires pretreatment prior to thin film deposition. In addition, it is necessary to have a hard layer, such as an anodic oxide, on the relatively soft aluminum substrate to impart hardness and scratch resistance to the final thin film product.

The thin film product performance of the present invention using an AA5657 aluminum alloy substrate provided total reflectance equal to or greater than 95% (measured on TR-2 Total Reflectometer); distinctness of image equal to or greater than 95% (measured according to ASTM E 430); 48 in. minimum coil width; an ability to withstand 1000 hours of exposure to the accelerated environmental conditions without evidence of delamination, blistering, yellowing or blushing, including constant condensation (per ASTM D 2247), constant ultraviolet radiation (per ASTM G 53 variation), a combination of ultraviolet radiation and humidity (per ASTM G 53), constant 5% salt spray (per ASTM B 117); formability to at least a 1 T radius bend without crazing or loss of coating adhesion; resistance to scratching after a minimum of 10 double rubs with 000 steel wool applied with light hand pressure; and no objectionable color or iridescence when illuminated by incandescent or fluorescent light (particularly the triphosphorus variety).

Comparable optical performance and durability of the thin film prototype were achieved by replacing the BDA on 5657 alloy sheet with a siloxane coating on both 5657 and 3003 aluminum alloy substrate. Product attributes were comparable to silver product.

The thin film lighting sheet prototype produced with a 5657 alloy sheet coated with a 20 vol.% phenyltrimethoxysilane infrared-cured siloxane has optical performance and durability comparable to a thin film lighting sheet product having as a substrate bright dipped and anodized (BDA) 5657 alloy sheet. This infrared-cured, 0.50 micron siloxane coating on 5657 alloy, which subsequently received a thin film deposition, has a hardness of a 2H pencil; formability of OT with no visible crazing; and resistance to accelerated testing in UV light, humidity and 5% salt spray for 1000 hours. In addition, the thin film prototype processed with a siloxane-coated 5657 does not have the objectionable blue haze characteristic of the thin film product produced with standard BDA on 5657.

Siloxane-coated aluminum alloy sheet can be produced in a continuous coil operation.

Roll coat application of up to 0.50 micron siloxane coating to coils of 5657 and 3003 alloy sheet were achieved at 10 fpm. The coating was cured at speeds up to 75 fpm with infrared curing ovens.

An increase in coating hardness from 1H to 2H pencil for a 0.50 micron phenyltrimethoxysilane siloxane can be achieved by infrared curing without adversely affecting aluminum alloy mechanical properties.

In accordance with the invention, there is provided coated aluminum metal sheet material having increased reflectivity. The material preferably comprises a substrate or base layer of aluminum metal or an aluminum alloy, a siloxane film overlying the base layer, and a reflector layer overlying the siloxane film. Surprisingly, we have found that reflectivity can be improved by applying a siloxane film to reduce surface roughness.

The aluminum metal reflector sheet is generally provided by aluminum metal or aluminum alloy metal. In one aspect, by aluminum metal or aluminum alloy metal is meant aluminum metal of 99% purity or higher, or an alloy of aluminum and manganese or an alloy of aluminum and magnesium. For example, AA1000, AA3000, or AA5000 aluminum can be used. The sheet material ordinarily has a thickness of about 500–800 microns. Prior to treatment in accordance with the present invention, the sheet has average surface roughness of greater than about 20 nm and usually about 40–50 nm.

Surface roughness of the sheet material is reduced by application of a siloxane film comprising polysiloxane in accordance with the present invention.

The siloxane film may be applied to the sheet material as a siloxane polymer solution. The specified siloxane polymer is polyphenylsilsesquioxane in accordance with the present invention. Evaporation of the solvent from the solution leaves the siloxane film planarizing layer.

The present invention includes applying the polymer coating of a polysiloxane liquid solution onto metal sheet or ceramic, i.e., including aluminum, iron, steel, silicon dioxide wafers, aluminum oxide, titania, zirconia, yttria, or SiAlON and drying to evaporate the carrier solvent. The liquid carrier solvent can be dried at a temperature above room temperature, e.g., such as at a temperature preferably in the range of about 75° C.–110° C. The carrier solvent preferably can be provided by various proportions of an alcohol/water mixture, such as, in one example, 95% by volume isopropanol/water mixture.

The polymer coating of the present invention provides a film coating for planarizing the aluminum sheet material or other substrates and for increasing the reflectivity of a reflector layer overlying the film.

We have found that the present invention requires a polymer coating of a monoaromatic siloxane. Polysiloxanes other than monoaromatic siloxane polymers, i.e., such as alkyl, vinyl, amine, or diphenyl polysiloxanes, do not produce the desired thermal protection and oxidative stability provided by the aromatic polysiloxane required in the process and composition of the invention.

The specified aromatic siloxane polymer coating can be prepared by a starting material of aromatic silane which is then hydrolyzed and then chemically condensed to form a cross-linked aromatic siloxane liquid polymer. The resulting composition is used to produce a polymer-coated metal substrate having superior planarization. Superior planarization is defined as a reduction of or smoothing of minute surface irregularities, such that surface roughness is reduced to less than 20 nm average, more preferably 10 nm or less on the average. Specular reflectance from such a superior planarized surface is greater than 95%. The preferred polyphenylsiloxane polymer of the Specified formula has been found to provide the desired planarizing produced and provided by the process and composition of the present invention.

The present invention produces a polymer-coated aluminum through the steps of providing a polyphenylsiloxane liquid polymer solution polymerized to have non-linear, ladder silicon to oxygen bonding, and coating the metal with the polyphenylsiloxane liquid polymer solution to form a polyphenylsiloxane polymer-coated aluminum having superior planarization, adhesion to thin films. The polymer-coated aluminum product has been observed to provide superior planarization properties, superior TR and DI, passivation against the elements and corrosion, durability, hardness, no blue haze, and effective adhesion properties to subsequent top coatings without loss of integrity and fracture or crazing.

The specified polyphenylsiloxane polymer can be provided by a starting material supplied by an aromatic silane monomer having one phenyl moiety. Preferably, the phenyl moiety is pendant on the silicon. The preferred starting material monomer is phenyltrimethoxysilane as depicted in the following chemical formula.

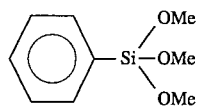

The aromatic silane monomer is hydrolyzed, e.g., by acid hydrolyzing, to form a hydrolyzed aromatic silane which then is condensed to form a cross-linked aromatic polysiloxane. The aromatic polysiloxane polymer preferably has a cross-linked structure to provide non-linear silicon to oxygen bonding, more preferably non-linear, ladder silicon to oxygen bonding wherein the phenyl moiety is pendant on the silicon.

The specified polyphenylsiloxane liquid polymer for coating metal in providing the essential elements of the present invention has a ladder cross-linked structure which can be depicted in the following molecular structure.

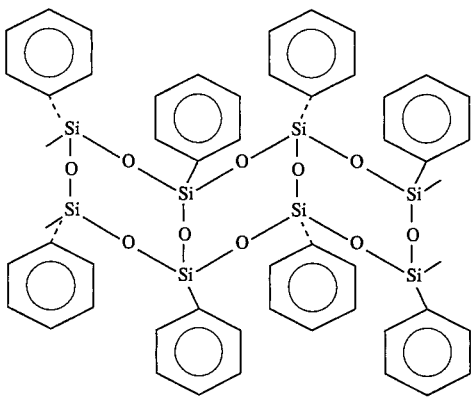

The ladder structure of the polyphenylsiloxane polymer of the present invention represents the two dimensional cross-linked structure, differentiates the preferred polyphenylsiloxane of the present invention from three dimensional cross-linked structures, and specifies the particular definition of the non-linearity of the preferred heterocyclic polymeric siloxane coating composition of the present invention having the specified n value of about 0.95 to 1.05 ) and a functionality X of 1.5.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

What is claimed is:

1. A method for producing a siloxane-coated aluminum metal reflector sheet, comprising:
   a. providing an aromatic silane monomer in a mixture of an alcohol and water;
   b. acid hydrolyzing said aromatic silane monomer to form a hydrolyzed aromatic silane;
   c. condensing said hydrolyzed aromatic silane to form a polysiloxane liquid solution consisting of aromatic polysiloxane in said alcohol and water mixture polymerized to have non-linear, ladder-polymer silicon to oxygen bonding; and
   d. coating an aluminum metal substrate with said aromatic polysiloxane liquid solution to form a polysiloxane polymer-coated aluminum metal substrate.

2. The method as set forth in claim 1, further comprising:
   e. depositing a film stacking reflective layer on said polysiloxane polymer-coated aluminum metal substrate.

3. The method as set forth in claim 2, wherein the aromatic polysiloxane comprises polyphenylsiloxane.

4. The method as set forth in claim 3, wherein said polyphenylsiloxane comprises cross-linked ladder-polymer heterocyclic polyphenylsiloxane and wherein said coating step comprises:
   (i) applying said cross-linked ladder-polymer heterocyclic polyphenylsiloxane as a dip coating liquid solution in an alcohol and water mixture to aluminum metal sheet; and
   (ii) withdrawing said aluminum metal sheet from said dip coating liquid solution at a rate of withdrawal speed to enhance total reflectivity in a subsequently applied film stack.

5. The method as set forth in claim 4, said aromatic polysiloxane consisting of polyphenylsiloxane wherein the phenyl moiety is pendant on the silicon.

6. The method as set forth in claim 5, wherein said aromatic silane monomer comprises a silane monomer having one phenyl moiety.

7. The method as set forth in claim 1, wherein said aromatic polysiloxane polymer consists of a compound having the general formula $R_n SiO_{(4-n)/2}$, wherein R comprises a mono-pendant phenyl radical, and n has an average value of about 0.95 to 1.05.

8. The method as set forth in claim 1, wherein said polysiloxane comprises a compound having the general formula $R_n SiO_{(4-n)/2}$, wherein R consists essentially of phenyl radical, and n has an average value of about 0.95 to 1.05.

9. The method as set forth in claim 1, wherein said polysiloxane contains the general formula $R_n SiO_{(4-n)/2}$, wherein R consists of phenyl radical.

10. The method as set forth in claim 1, wherein said coating step comprises applying said polysiloxane solution as a dip-coating liquid onto aluminum metal sheet.

11. The method as set forth in claim 10, wherein said coating step comprises withdrawing from said liquid polysiloxane solution at a withdrawal speed to enhance total reflectivity in a subsequently applied film stack.

12. The method as set forth in claim 11, wherein said coating step comprises drying said polysiloxane solution onto said aluminum metal sheet at a temperature in the range of about 75°–110° C.

13. A method for producing a polymer-coated aluminum metal sheet, comprising:
   (a) providing a polysiloxane liquid solution having non-linear silicon to oxygen bonding characterized by the general formula of $R_n SiO_{(4-n)/2}$, wherein R is a phenyl radical and n has an average value of about 0.95 to 1.05, said polysiloxane being formed by acid hydrolyzing mono-phenyl silane monomer and condensing to form a cross-linked polyphenylsiloxane polymer having ladder-polymer heterocyclic silicon to oxygen bonding;
   (b) applying said cross-linked ladder-polymer heterocyclic polyphenylsiloxane as a dip coating liquid solution in an alcohol and water mixture to an aluminum metal sheet;
   (c) withdrawing said aluminum metal sheet from said dip coating liquid solution at a withdrawal speed to enhance total reflectivity in a subsequently applied film stack;
   (d) drying said liquid cross-linked, ladder-polymer, heterocyclic polyphenylsiloxane onto said aluminum metal sheet at a temperature of about 75° C.–110° C. to form a polyphenylsiloxane polymer-coated aluminum metal sheet; and
   (e) applying said film stack onto said polyphenylsiloxane polymer-coated aluminum metal sheet.

* * * * *